April 3, 1934.   E. P. BURRELL   1,953,876
INDEXING MECHANISM
Filed April 13, 1931   8 Sheets-Sheet 1

April 3, 1934.  E. P. BURRELL  1,953,876
INDEXING MECHANISM
Filed April 13, 1931   8 Sheets-Sheet 3

Inventor
Edward P. Burrell
Kwis Hudson & Kent
attys.

April 3, 1934.  E. P. BURRELL  1,953,876
INDEXING MECHANISM
Filed April 13, 1931   8 Sheets-Sheet 7

Inventor
Edward P. Burrell
Kwis Hudson & Kent
attys.

April 3, 1934.　　　E. P. BURRELL　　　1,953,876
INDEXING MECHANISM
Filed April 13, 1931　　　8 Sheets-Sheet 8

Inventor.
Edward P. Burrell
Kwis Hudson & Kent
attys.

Patented Apr. 3, 1934

1,953,876

UNITED STATES PATENT OFFICE 1,953,876

INDEXING MECHANISM

Edward P. Burrell, Shaker Heights, Ohio, assignor to The Warner & Swasey Company, Cleveland, Ohio, a corporation of Ohio Application April 13, 1931, Serial No. 529,613

38 Claims. (Cl. 29—49)

This invention relates to an indexing mechanism for imparting a step-by-step indexing movement to a member to be indexed. Although the mechanism of the invention is capable of being used in a variety of different types of machines having a member to be indexed, it has particular utility in connection with machine tools and for that reason has been illustrated herein as applied to the turret of a machine tool.

An object of the invention is to provide an indexing mechanism for a member to be indexed, locked and clamped, such as a turret or the like, which mechanism is capable of imparting a step-by-step indexing movement to the member.

Ordinarily, a member to be indexed, such as a turret, is locked against rotation and clamped in such locked position. Then the lock is released, the member is unclamped, and a step-by-step indexing movement is given to the member, after which the member is again locked and clamped. A further object of the invention is to provide an indexing mechanism for a member, such as a turret or the like, which includes means for locking the member, clamping the same in locked position, then unlocking and unclamping the member after it has performed its required function, giving the member a step-by-step indexing movement, and then again locking and clamping the same.

A more specific object is to provide an indexing mechanism for a moving member, such as a turret or the like, wherein the unlocking and unclamping of the member, the step-by-step indexing movement thereof, and the locking and clamping thereof occur during movement of the member in one direction.

A further object of the invention is to provide an indexing mechanism for a moving member, such as a turret or the like, wherein the locking and clamping of the member, the unlocking and unclamping thereof, and the step-by-step indexing movement of the member, followed by the relocking and reclamping thereof take place during the last portion of the movement of said member in one direction.

Another object of the invention is to provide an indexing mechanism for a reciprocating member, such as a turret or the like, wherein the means that imparts the step-by-step indexing movement to the turret travels in one path during the movement of said member in one direction to index the member and returns along another path during the movement of said member in the opposite direction.

A further object is to provide an indexing mechanism for a member, such as a turret or the like, wherein a single actuator effects the unlocking, unclamping, indexing, locking and clamping of the member.

A still further object is to provide an indexing mechanism for a member to be indexed, locked and clamped, such as a turret or the like, wherein a single movable actuator effects the unlocking, unclamping, indexing, locking, and clamping of said member during the movement of said actuator in one direction.

Additional objects and advantages will appear more fully hereinafter during the detailed description of an embodiment of the invention which is to follow.

In the accompanying drawings illustrating an embodiment of the invention as applied to a turret lathe, Figure 1 is a top plan view of the turret saddle of a turret lathe, the turret being shown in horizontal section along line 1—1 of Fig. 4, and a cover plate covering part of the indexing mechanism carried by the turret saddle being removed;

Figure 9:
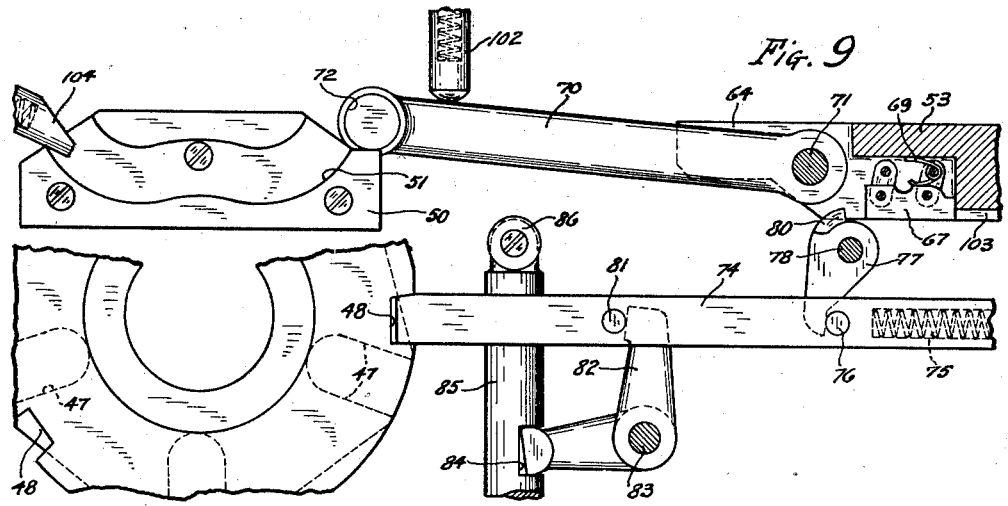
Fig. 9 is a detached view showing in full lines a portion of the turret and certain of the parts of the indexing mechanism in the position they occupy before indexing.
Figure 10:
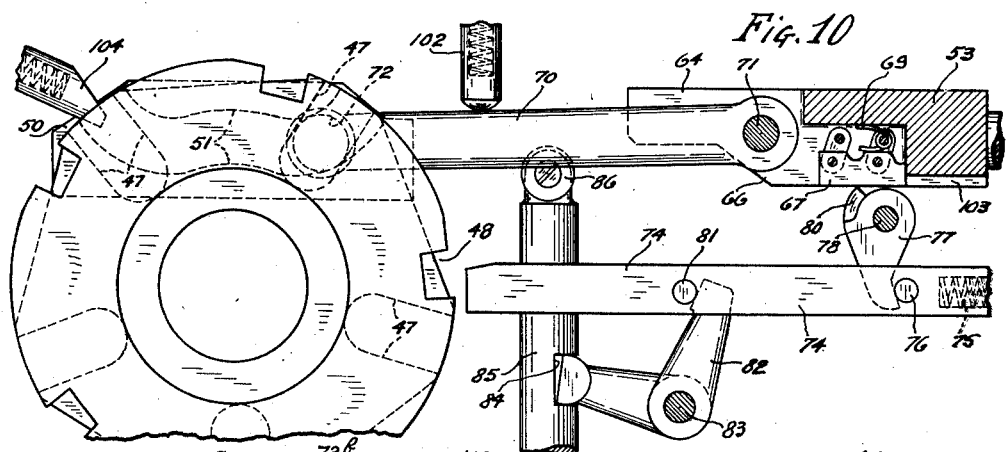
Figure 11:
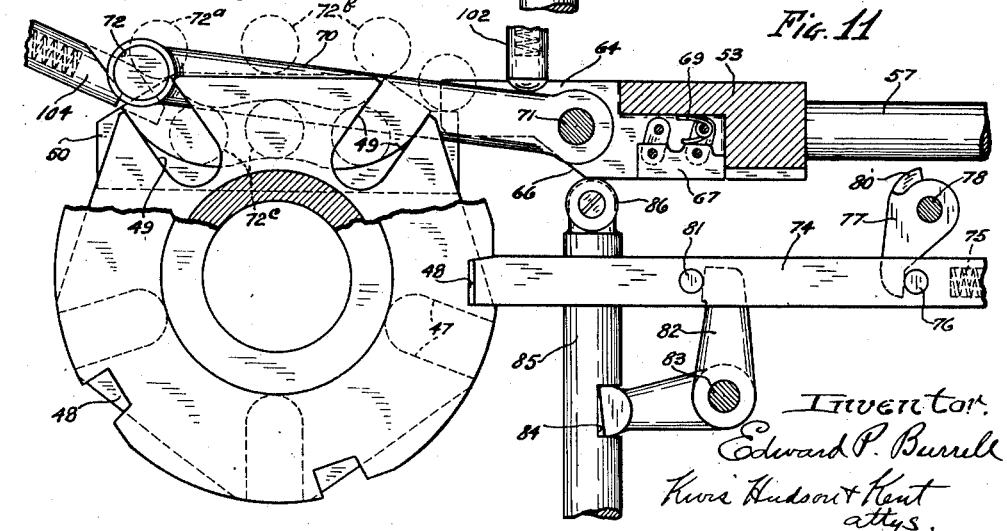

Fig. 10 is a view similar to Fig. 9 showing the arrangement of the same parts in the position they occupy after indexing has started and the turret partly rotated; and Fig. 11 is a detached view showing the arrangement of the same parts after indexing has been completed and indicating by dotted lines the various positions and path of a portion of the indexing lever during the entire indexing movement.

There has been illustrated in the drawings a portion of the bed of a turret lathe and the turret saddle, it being understood that the turret lathe is also provided with a head adjacent the end of the bed opposite that upon which the turret saddle is arranged, which head supports a spindle for the work or tool, as the case may be, and that the turret saddle and turret, during the operation of the lathe, move toward and away from the head to bring the work or tools carried by the turret into operative engagement with the work or tools carried by the spindle in the head. Ordinarily, the movement of this turret saddle and turret includes a rapid forward movement toward the head, then a slower or feeding movement, during which the tools operate on the work, and then a rapid return movement of the turret saddle and turret to separate the tools and the work and to allow the turret to be indexed. The parts and movements of a turret lathe, as just above mentioned, are well understood in the art, and for that reason further reference thereto in this application is unnecessary other than reference to the movements of the turret saddle and turret essential to a proper description of the indexing mechanism.

Figure 1:
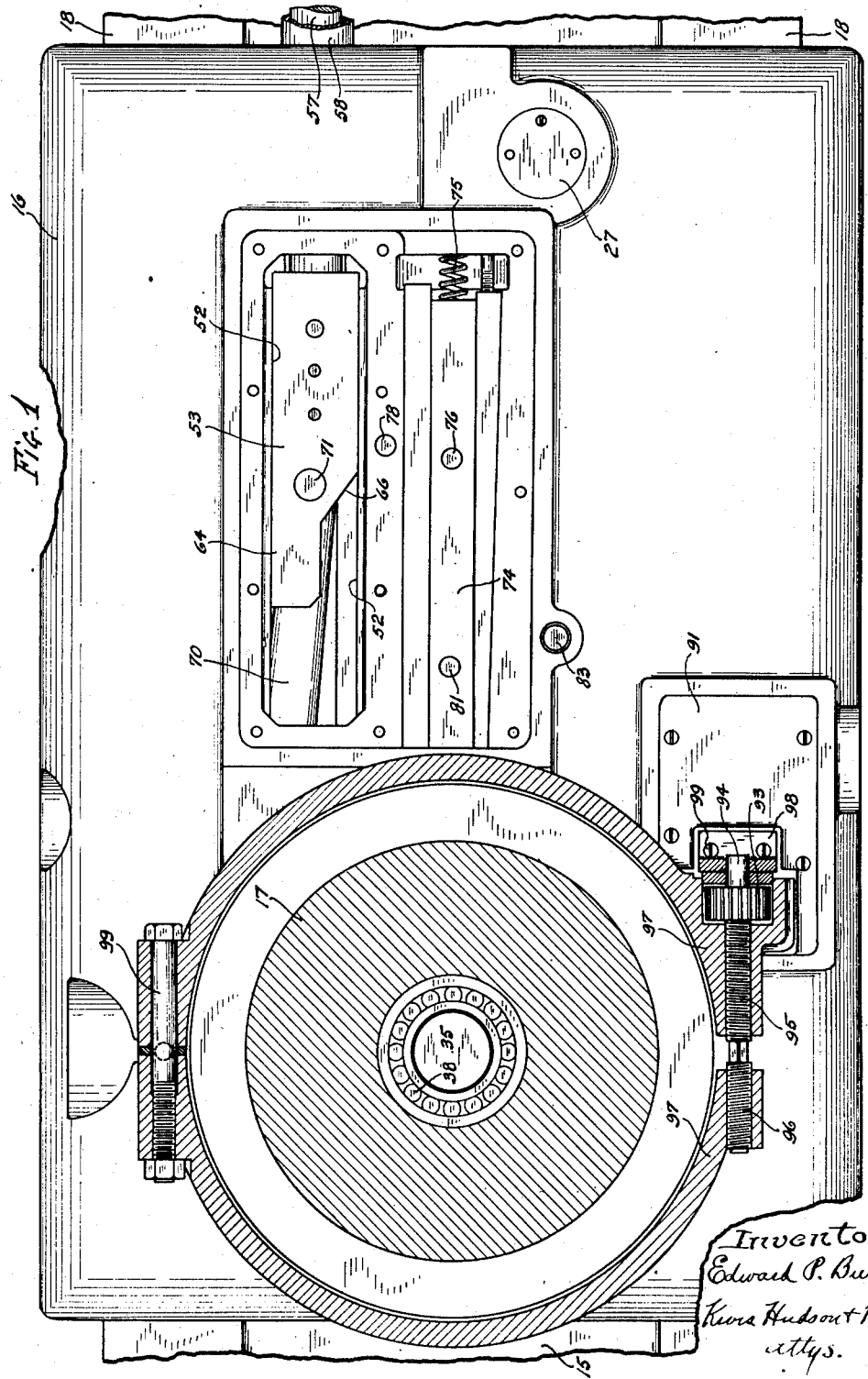
Figure 2:
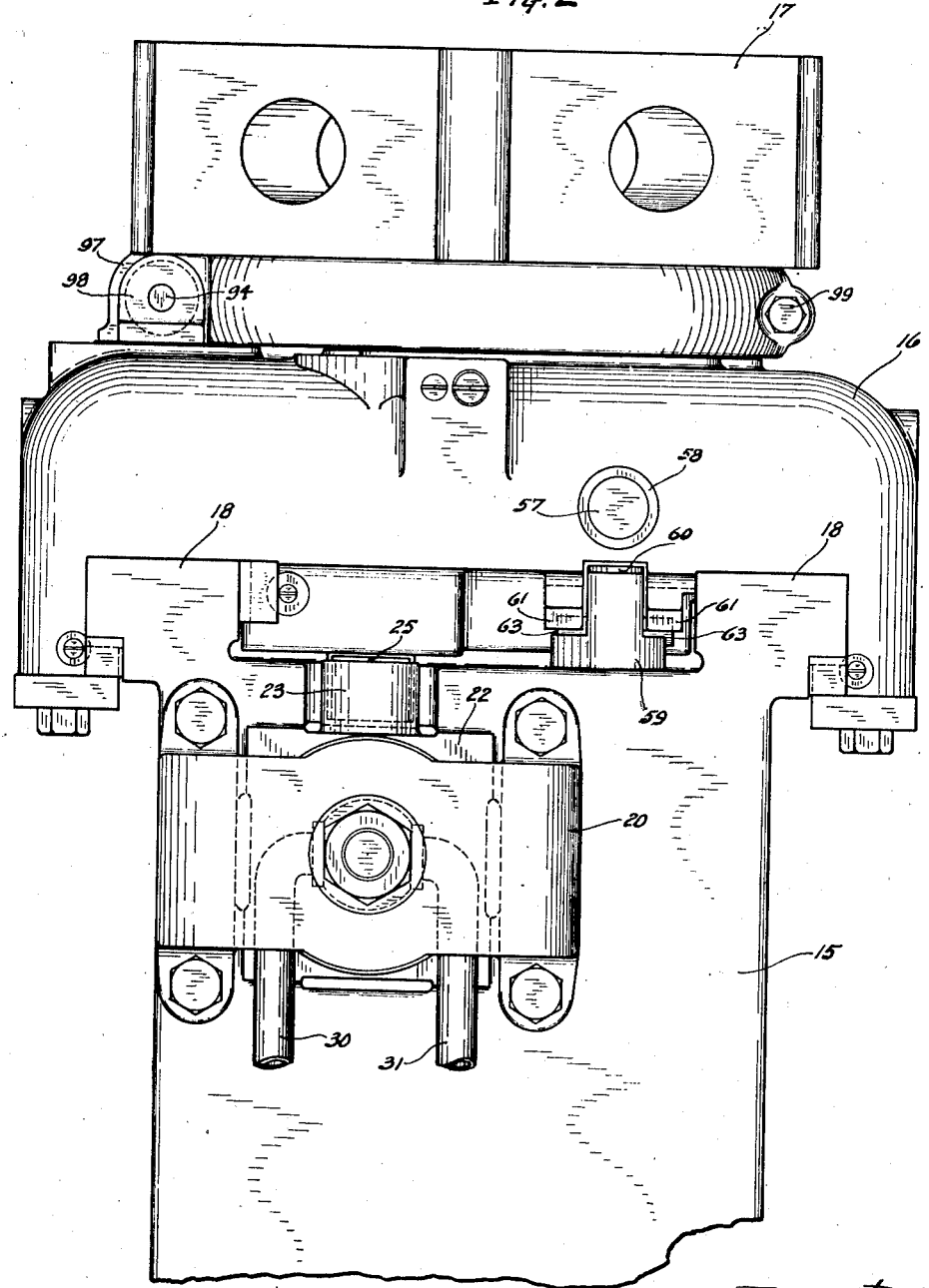
Fig. 2 is an end elevational view of a turret and turret saddle and a portion of the bed of the turret lathe, this view being taken from the right-hand side of Fig. 1.
Figure 3:
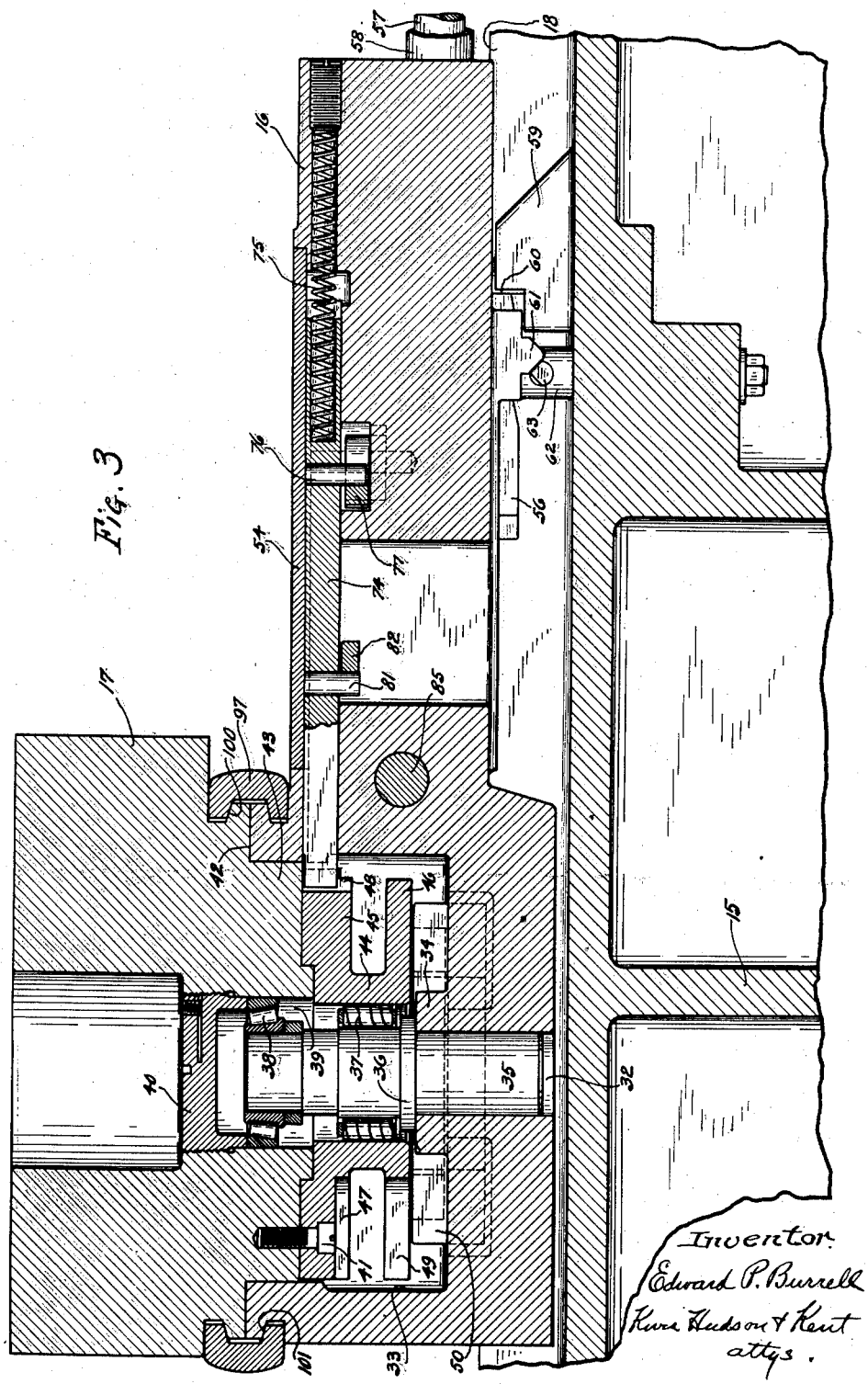
Fig. 3 is a longitudinal vertical irregular section through the turret and turret saddle and is taken substantially on line 3—3 of Fig. 6, looking in the direction of the arrows.
Figure 5:
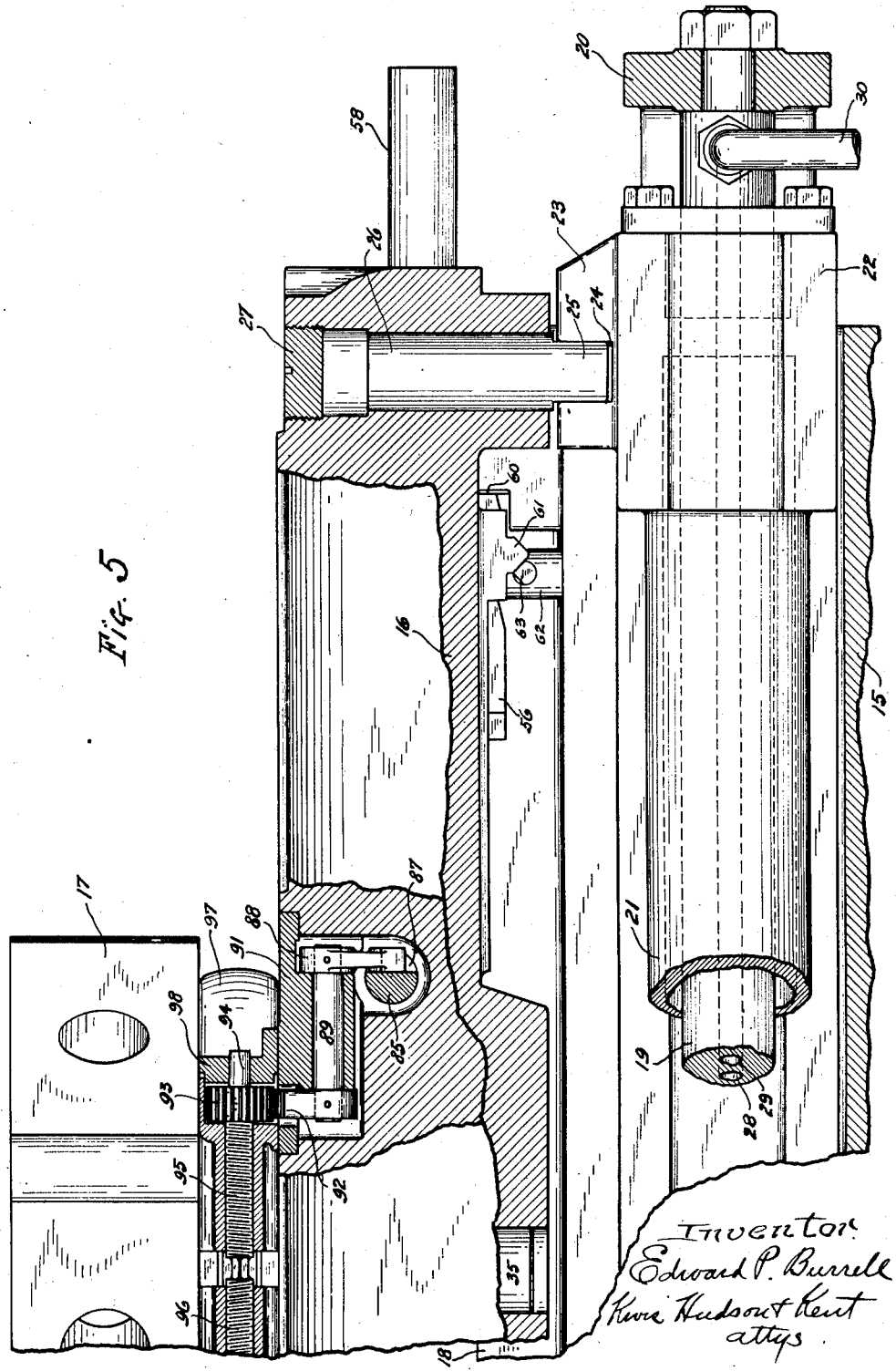
Fig. 5 is an irregular, longitudinal vertical section through the turret saddle and the bed taken substantially on line 5—5 of Fig. 6, looking in the direction of the arrows.

Referring to Figs. 2, 3 and 5 of the drawings, the bed of the lathe is indicated at 15, the turret saddle at 16, and the turret at 17. The turret saddle 16 is arranged to slide longitudinally of the bed 15 upon ways 18 and is retained in proper position on the bed 15 by suitable gibs and clamping members, as is well understood. Although the saddle 16 may be moved along the ways 18 of the bed by any suitable power means, a hydraulic motor has been shown herein as constituting the power means in this particular instance.

This motor comprises a piston 19 the rear end of which is supported in a bracket 20 fixed to the end of the bed 15. The piston 19 is enclosed in a cylinder 21 which is slidably supported in the bed on independent guideways below the saddle and is connected to said saddle 16 by a cylinder head 22 having an upwardly extending portion 23 provided with a slot 24 within which engages the reduced lower end 25 of a shouldered pin 26 carried by the rear end of the turret saddle 16 and locked in position in the saddle by means of a nut 27.

The cylinder head 22 is preferably rectangular and fits within a guideway in the bed 15, as clearly illustrated in Figs. 2 and 5, and a similar cylinder head may be provided at the front end of the cylinder, not shown, whereby the cylinder may slide in the bed in parallel relation to the ways on the bed for the turret saddle. The piston 19, having a piston head not shown, is provided with a pair of passageways 28 and 29 extending through the piston from the rear end thereof and communicating with the cylinder 21 on opposite sides of the piston head. The passageways 28 and 29 are connected to pipes 30 and 31 which serve as inlet and exhaust pipes and are in turn connected with a suitable pump and relief valve, not shown, as is well understood in the art.

It will be clear that in order to move the turret saddle in one direction or the other, pressure fluid flows through either pipe 30 or pipe 31 into one or the other of the passageways 28 and 29 and causes the cylinder 21 to move relative to the piston head of the piston 19, and since the cylinder is connected to the saddle 16, the latter will be correspondingly moved along the ways of the bed 15. The movement of the turret saddle effected by the hydraulic motor includes the rapid forward movement, the feeding movement, and the return movement of the turret saddle previously referred to in the general discussion of the operation of a turret lathe, suitable control mechanism for the motor being provided for this purpose.

The saddle 16 is provided adjacent its forward end with a vertically extending opening 32 preferably located on the center line of the saddle and communicating at its upper end with an enlarged counterbore 33, there being a raised shoulder 34 in the bottom of the counterbore 33 and surrounding the upper end of the hole 32. A bearing shaft 35 is pressed into the opening 32 and has a flange 36 which bears upon the shoulder 34 in the counterbore 33.

The turret 17, which as illustrated herein has five faces, is rotatably supported on the saddle 16 upon the shaft 35 by means of roller bearings 37 arranged between the shaft and the turret adjacent the flange 36 and a tapered roller bearing 38 located at the upper end of the shaft, it being understood that a suitable opening 39 is centrally arranged in the turret to receive the shaft 35 and the bearings 37 and 38. It will be observed that the roller bearing 37 radially centralizes the turret on the shaft, while the taper roller bearing 38 carries the weight of the turret to allow free rotation thereof and also to take the thrust. The turret has a nut 40 arranged in the opening 39 and engageable with the tapered roller bearing 38 for the purpose of raising and lowering the turret and thereby adjusting its height.

In order to facilitate the machining and assembly of the turret, it is made of two parts, the upper part of which is provided with five faces and the other part of which is located within the counterbore 33 of the saddle, said parts being held together by a number of screws, as indicated at 41 in Fig. 3. The upper part of the turret is provided with a shoulder 42 that bears upon an annular shoulder on the upper surface of the saddle and it is also provided with a portion 43 extending into the counterbore 33 of the saddle. The lower part of the turret comprises a hub portion 44 having at its opposite ends disc portions 45 and 46, the arrangement being such that a space is provided between the discs 45 and 46 for a purpose later to be explained.

Figure 6:
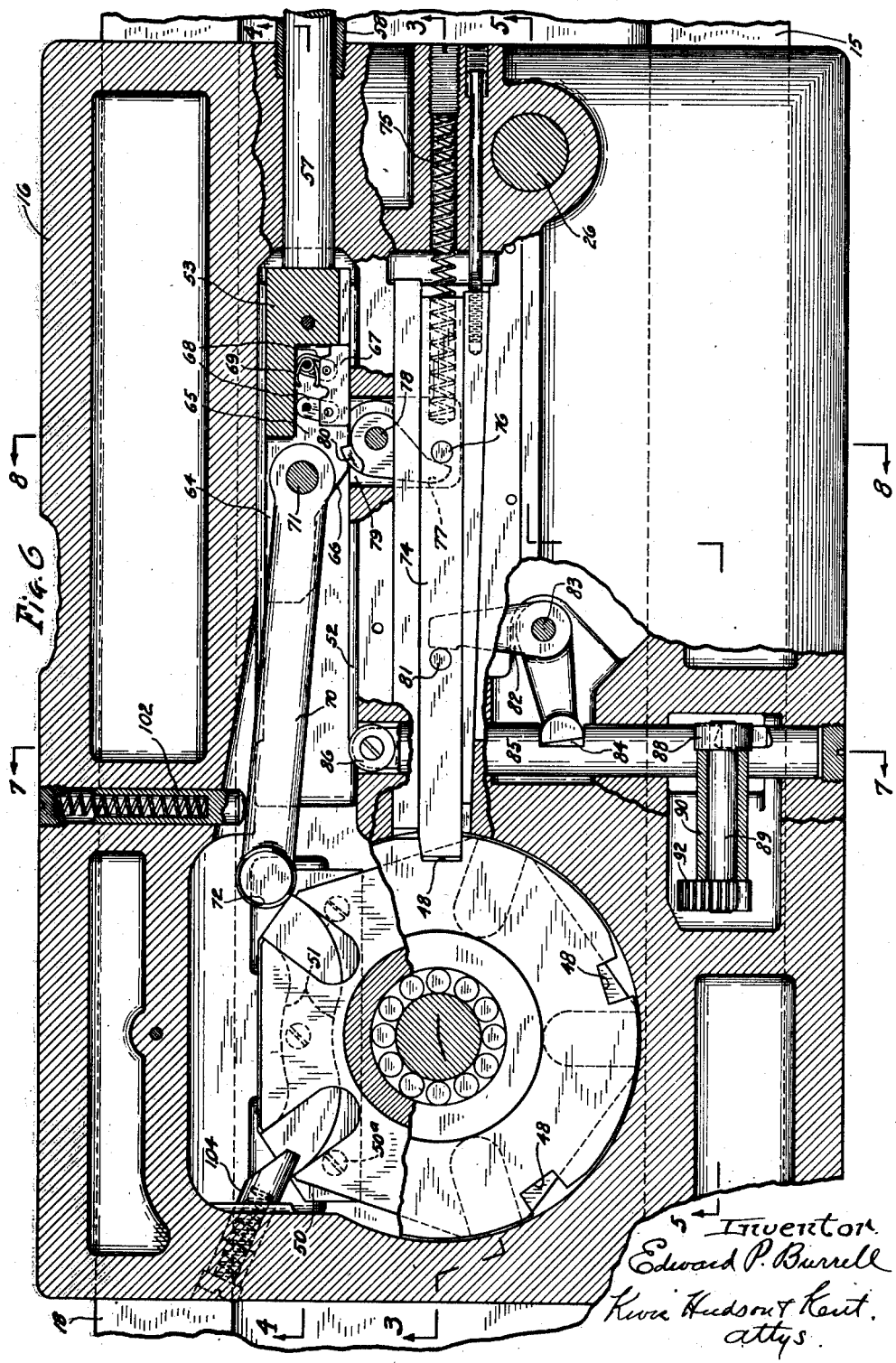
Fig. 6 is a longitudinal horizontal section through the turret saddle taken substantially on line 6—6 of Fig. 4, looking in the direction of the arrows.

The upper disc 45 is substantially circular in form and is provided with five radially disposed grooves 47 on its under side, as shown in Figs. 3 and 6, and with five reentrant notches 48 in its circumference, as shown in Figs. 3 and 6. The lower disc 46 is five sided to correspond to the five sided turret 17 (see Fig. 6) and is provided with five radially disposed slots 49 lying in vertical alignment with the grooves 47 in the disc 45 and located at the apices of the five sides. The purpose of the grooves 47, the notches 48 and the slots 49 will become apparent during the description of the invention which is to follow.

In the bottom of the counterbore 33 in the saddle 16 and on the rear side of the shaft 35 there is arranged a cam block 50 secured to the saddle by screws 50ᵃ and provided with a cam, in this instance a cam groove 51, shown in dotted and full lines in Figs. 6 and 10 and in full lines in Fig. 9 for a purpose also to be explained later. In using the term "block", I mean any member having a cam or cam groove that may be secured in any suitable way to the saddle for the purpose of guiding a part of the indexing mechanism, later to be referred to, along a predetermined path. The saddle 16, at the right of the turret as viewed in the drawings, is provided with a guideway or channel 52 extending longitudinally of the saddle and in which is slidably mounted an actuator or block 53, the actuator or block being supported upon ways formed in the channel 52, there being a pair of such ways on each side and at the bottom of the channel and a pair on the under side of a cover plate 54, as clearly shown in Figs. 4, 7 and 8. The guideway 52 is provided at its bottom with an extended slot 55 within which slides a downward extension 56 of the actuator or block 53.

Figure 4:
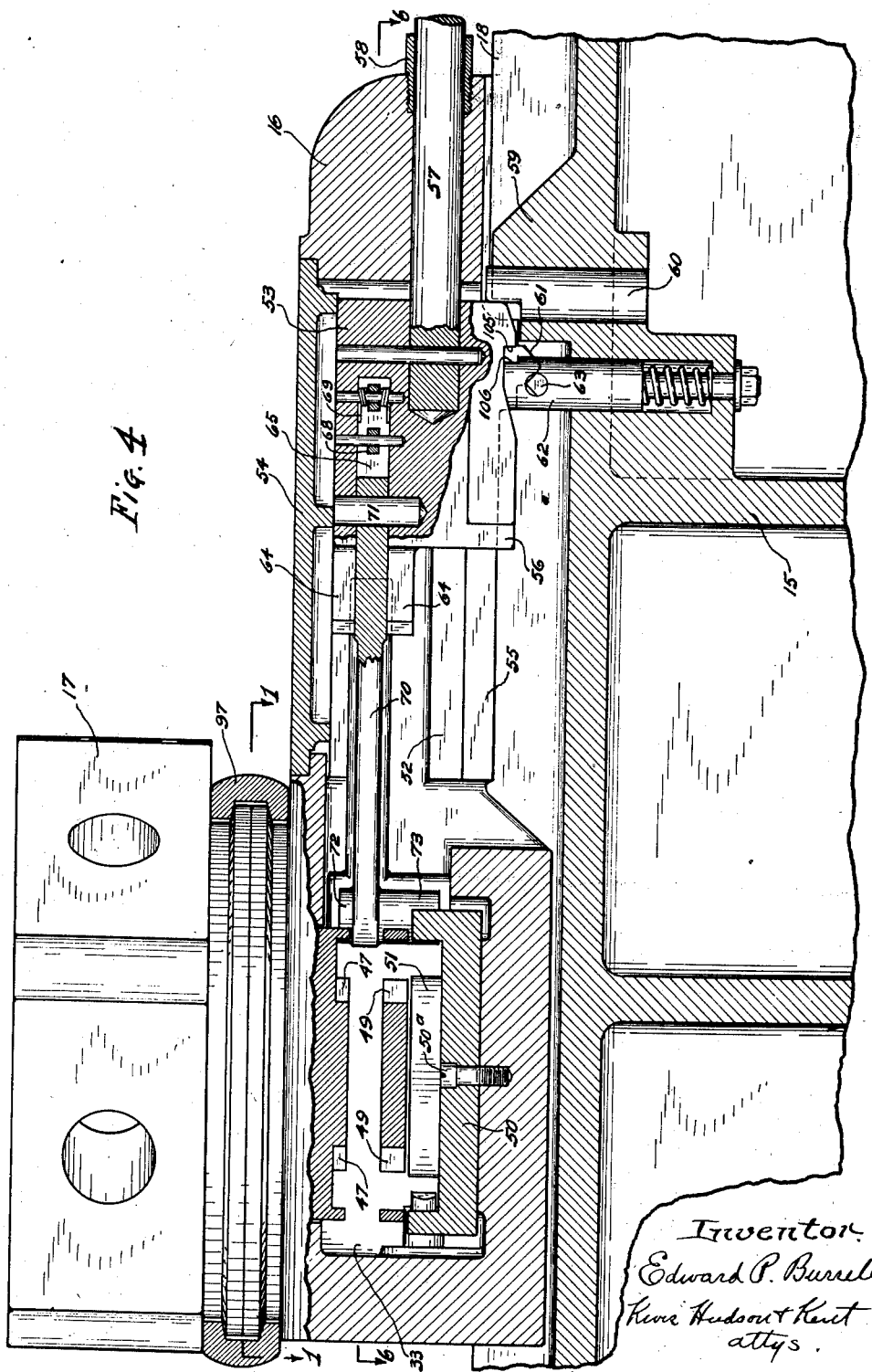
Fig. 4 is a longitudinal vertical section through the turret saddle taken substantially on the line 4—4 of Fig. 6, looking in the direction of the arrows.

A guide bar 57 is connected to the actuator 53 and extends rearwardly therefrom through an opening in the saddle 16 in order to steady and give rigidity to the actuator when it reaches its most forward position, that is from the position shown in Figs. 4 and 6 to that shown in Fig. 10. A tubular member 58 is secured to the end of the saddle and surrounds the outer end of the guide bar 57 for the purpose of excluding dirt and dust from the surface of the bar 57.

Figure 8:
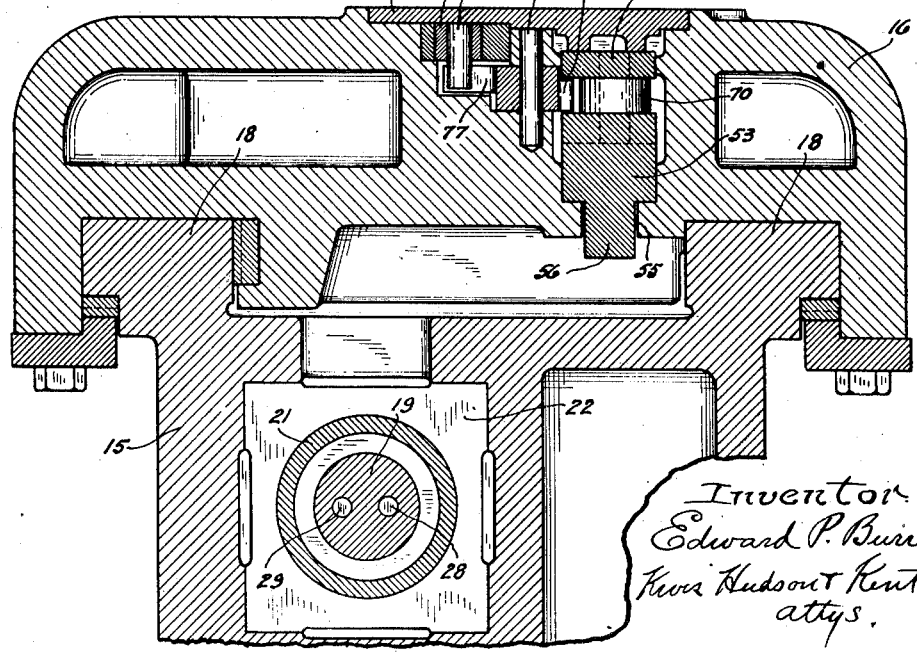
Fig. 8 is a fragmentary transverse vertical section through the turret saddle taken on line 8—8 of Fig. 6 and looking in the direction of the arrows.

The bed 15 is provided near its right hand end, as viewed in the drawings, and rearwardly of the longitudinal center line with an upwardly extending boss 59 having an abutment pin 60 arranged in a vertical opening formed in the boss 59 and located centrally of the slot 55 in the saddle, as clearly shown in Figs. 2, 4 and 8. When the actuator or block 53 is in its most rearward position, such as that shown in Fig. 4 of the drawings, with the slide still traveling rearwardly, it will be noted that the rear end of the extension 56 is in abutting relation with the upper end of the abutment pin 60, such end of the pin 60 having a cutaway shoulder to form the abutment. The sides of the slot 55 in the saddle at the righthand end of the slot are extended downwardly to form cam surfaced projections 61 lying on opposite sides of the downward extension 56 of the actuator or block 53.

The bed 15 is provided forwardly of the abutment pin 60 and in alignment therewith with a spring-pressed holding pin 62 (see Fig. 4) having adjacent its upper end transversely extending camming portions 63 which are arranged to cooperate with the camming projections 61. When the saddle 16 reaches the point in its rearward movement at which the indexing mechanism is to commence functioning, the actuator or block 53 rides over the holding pin 62 and then abuts the pin 60, while the camming projections 61 of the saddle ride over the camming portions 63 carried by the holding pin 62. The saddle continues to move rearwardly while the actuator is held stationary by the abutment pin 60, thereby thus being created a relative movement between the saddle and the actuator during which the indexing mechanism completely functions by the time the saddle has reached its most rearward position.

The actuator or block 53 has a pair of vertically spaced forwardly extending arms 64 providing a slot therebetween which extends in the form of a recess 65 into the block or actuator. Each arm 64 is provided with a cam surface 66 adjacent the inner ends of the arms 64 for a purpose later to become apparent.

A sliding and swinging dog 67 is arranged in the recess 65 (see Figs. 6 and 8) and is pivotally supported upon a pair of links 68 which are in turn pivoted to the actuator 53. A pair of springs 69 are carried by the pivot pin of the rearward link 68 and engage the actuator 53 and the sliding and swinging dog 67 so that the dog will be held in its outer position and an abutting relationship retained between the actuator 53 and the rear end of the dog, as clearly shown in Fig. 6.

An indexing lever 70 is carried by the actuator 53 and pivoted thereto by a pivot pin 71 carried by the arms 64 adjacent to the cam surfaces 66 of said arms. The forward or free end of the indexing lever 70 is provided on the upper side of the lever with a cylindrical portion 72 and on the under side with another cylindrical portion 73 (see Fig. 4). The cylindrical portion 72 is arranged to engage in the radial grooves 47 in the disc portion 45 of the turret when the lever 70 moves with the actuator 53 relative to the saddle while the longer cylindrical portion 73 is arranged to engage in the radial slots 49 of the disc portion 46 of the turret and also in the cam groove 51 of the cam block 50. It should be noted that when the cylindrical portions 72 and 73 are in the groove 47 and slot 49 respectively (see Fig. 10), the movement of the forward part of the lever 70 is guided by the cam groove 51 in which the cylindrical portion 73 travels.

A lock bolt 74 is slidably mounted in the saddle (see Figs. 6 and 7), and is urged forwardly by the spring 75 to position the forward end of the lock bolt 74 in one of the various lock notches 48 and to retain said lock bolt in position in said notch. The lock bolt 74 adjacent its rear end is provided on its lower surface with a downwardly extending pin 76 engaging with a lever 77 pivoted at 78 in the saddle in a recess 79 which communicates with the guideway for the actuator 53 (see Figs. 6 and 8). The lever 77 has a portion 80 projecting into the recess 65 in the actuator 53 and slightly less in thickness than the width of said recess. Forwardly of the pin 76, the lock bolt 74 is provided with a second downwardly extending pin 81 which cooperates with the end of one of the arms of a bell crank lever 82 pivoted at 83 to the saddle, the other arm of said bell crank lever 82 having its free end arranged in a notch 84 formed in a bar 85 slidably mounted in the saddle and moving transversely of the direction of movement of the lock bolt 74.

Figure 7:
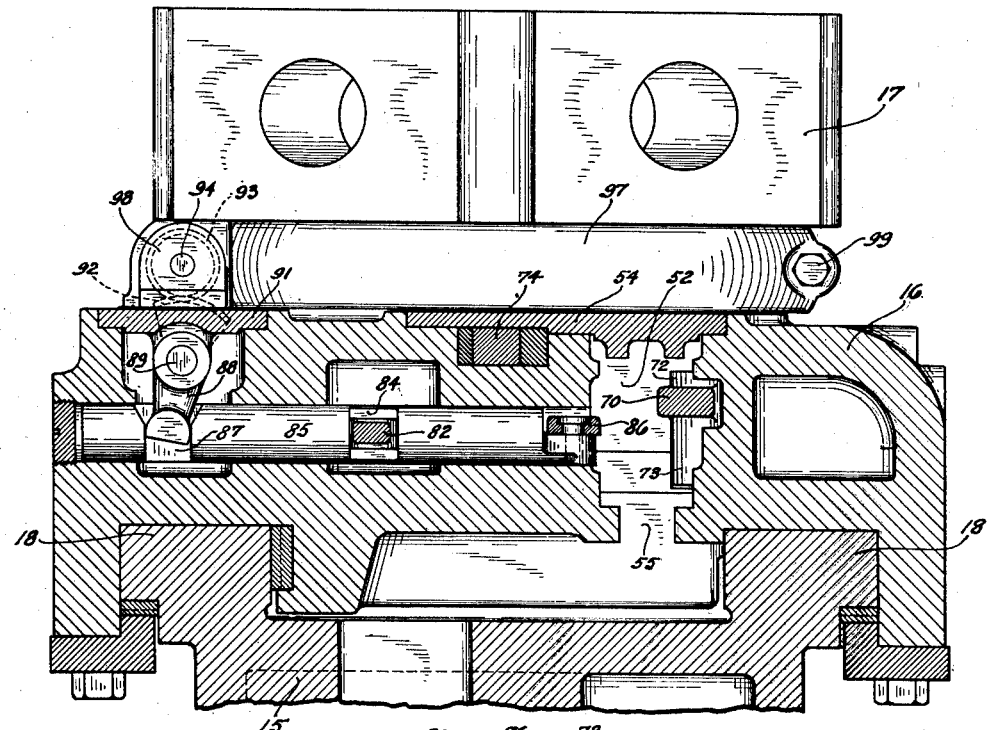
Fig. 7 is a transverse vertical section through the turret saddle and a portion of the bed taken substantially on line 7—7 of Fig. 6, looking in the direction of the arrows.

The bar 85 extends crosswise of the saddle and to the guideway for the actuator 53 and is provided at its end with a roller 86 extending into the guideway between the guiding portions thereof (see Figs. 6 and 7). The bar 85 near its other end is provided with an opening 87 in which engages the end of a rocker arm 88 carried by a rocker shaft 89 mounted in a bearing 90 formed in the cover plate 91. The other end of the rocker shaft 89 has fixed thereto a gear segment 92 which gear segment meshes with a gear 93 fixed on a shaft 94 having right and left hand screw portions 95 and 96.

The screw portions 95 and 96 of the shaft 94 are carried by the two halves of clamping rings 97 while the end of the shaft 94 rearwardly of the gear 93 is carried by an angle bracket 98 secured to the cover plate 91 (see Figs. 5 and 7). The two halves of the clamping ring 97 are hinged at their rear ends upon a bolt 99 while their camming surfaces cooperate with the camming surface 100 on the turret and camming surface 101 on the saddle (see Figs. 3 and 4). It will be seen that the endwise movement of the bar 85 will cause the gear segment 92 to be rocked in one direction or the other and transmit through the gear 93 turning movement to the right and left hand screws 95 and 96 whereby the two halves 97 of the clamping ring will either be drawn together or spread apart according to the direction of movement of the bar 85 and thus the turret can be clamped to the saddle or unclamped with respect thereto.

When the tool or work carried by one of the faces of the turret is in working relationship with the tool or work carried by the spindle in the head of the machine, the saddle 16 is near its most forward position and the turret 17 is clamped to the saddle by the clamping rings 97, while the locking bolt 74 is in engagement with one of the notches 48 in the disc 45 of the turret. As soon as the feeding movement of the saddle and the usual dwell period have been completed, the direction of the pressure fluid entering the cylinder 21 is reversed and the saddle commences to move rearwardly away from the head of the machine, the clamping and locking mechanism for the turret still remaining in the relationship referred to above.

The rearward movement of the saddle continues and at a point prior to the saddle reaching its most rearward position, the actuator or block 53 carried by the saddle rides over the pin 62 and abuts the pin 60, thereby holding the actuator stationary. The saddle 16, however, continues its rearward movement with the cam projections 61 riding over the cam portions 63 carried by the pin 62. This further rearward movement of the saddle while the actuator 53 is held stationary, causes the actuator to move forwardly relative to the saddle.

At the commencement of this relative forward movement of the actuator, the cylindrical portions 72 and 73 carried by the lever 70 are in the positions indicated in Figs. 4, 6 and 9, and the actuator 53, in moving forwardly in its guideway, causes the front end of the dog 67 carried thereby to engage the portion 80 of the lever 77 and to rock said lever in an anti-clockwise direction so that the lever engaging the pin 76 will retract the lock bolt 74 against the tension of the spring 75 and thus withdraw said bolt from the locking notch 48 in the turret.

This rearward movement of the lock bolt 74 causes the pin 81 carried thereby to engage the bell crank lever 82 and to rock the same in a clockwise direction to the position shown in Fig. 10. The rocking movement of the bell crank lever moves the bar 85 inwardly toward the rear side of the saddle so that the rocker arm 88, rocker shaft 89 and gear segment 92 are moved and the gear 93 and screw portions 95 and 96 of the shaft 94 rotated to release the clamping rings 97 and thus unclamp the turret so that it is free to rotate and to be indexed.

The movements so far described change the relative positions of the actuator 53, lever 70, lock bolt 74 and rod 85 from the position shown in Fig. 9 to the position shown in Fig. 10. It will be noted that when the actuator 53 has moved forward to the position shown in Fig. 10, the dog 67 will have swung the lever 77 sufficiently to enable the dog to ride over the portion 80 of the lever and also that the pivoted lever 70 will have been moved during this movement of the actuator 53 by means of a spring-pressed plunger 102 carried by the saddle and engaging the rear side of the lever 70 into a position where the cylindrical portion 72 has entered the radial groove 47 in the disc 45 of the turret and the longer cylindrical portion 73 has entered the slots 49 in the disc 46 of the turret and the cam groove 51 in the cam block 50 (see Fig. 10 wherein the turret is shown as having commenced its indexing rotation).

The relative forward movement of the actuator 53 continuing, the cylindrical portion 72 of the lever 70 engages the base of the radial groove, and the cylindrical portion 73 engages the base of the radial slot 49 and also follows the configuration of the cam groove 51 of the cam block 50 and thus the cam groove directs or guides the movement of the forward end of the lever 70 (see the dotted line positions of lever portion 72 indicated in Fig. 11 at 72c) while such movement of the lever is causing the turret to continue its indexing rotation. During this continued forward movement of the actuator 53, the dog 67 rides off the lever 77, whereupon the spring 75 projects the lock bolt 74 forwardly until its end is in engagement with the circumference of the upper disc 45 of the turret, such movement of the lock bolt 74 swinging the lever 77 in a clockwise direction with the portion 80 of the lever engaging in a groove 103 in the actuator.

It will be seen that this forward movement of the lock bolt 74 does not affect the bell crank lever 82 and that, therefore, the turret binding or clamping mechanism is not actuated and the turret remains unclamped with respect to the saddle. The forward movement of the actuator 53 continues until it reaches its most forward position relative to the saddle, as shown in Fig. 11, at which time the turret has been completely indexed and the lock bolt 74 has engaged a lock notch 48 in the disc 45.

It will be seen that the indexing rotation of the turret and the movement of the lever 70 has caused the cylindrical portion 73 to travel through the cam groove in the cam block 50 to the end of such groove, at which time the cylindrical portion 73 engages the cam end of a spring plunger 104 which causes the lever 70 to swing outwardly against the action of the spring plunger 102 and the cylindrical portions 72 and 73 to leave the groove 47, slot 49 and cam groove 51. When the actuator 53 has reached this position, it will be seen that the bar 85 has been moved toward the front of the saddle, due to the roller 86 carried by the inner end of the bar engaging with one of the cam surfaces 66 of the arms 64 of the actuator (see Fig. 11).

This movement of the bar 85 will rock the bell crank lever 82 to its former position or until it is in engagement with the pin 81 carried by the lock bolt 74 and will also rock the rocker arm 88, rock shaft 89, and gear segment 92 to rotate the gear 93 and screw portions 95 and 96 of the shaft 94 to draw the two halves of the clamping rings 97 together and cause the cam surfaces thereon to cooperate with the cam surface 100 on the turret and cam surface 101 on the saddle to clamp the turret to the saddle. When this relationship between the parts has taken place, the saddle is in its most rearward position and is ready to commence its forward movement to start a new cycle of operations.

The direction of the pressure fluid entering the cylinder 21 is now changed and the saddle starts its forward movement. As soon as the saddle commences its forward movement, the locking shoulder 105 on the projection 56 of the actuator engages with a locking shoulder 106 on the pin 62 (see Fig. 4) and the actuator is thus held stationary for a short period while the saddle moves forwardly, thereby causing the actuator to have a relative movement rearwardly of the saddle. Just before the relative rearward movement of the actuator commences, the spring plunger 104, which is indicated in Fig. 11 in its most outward position, throws the lever 70 outwardly to the position shown in dotted lines, indicated at 72ᵃ in Fig. 11, at which time the cylindrical portion 73 is in engagement with the rear side of the cam block 50. The relative rearward movement of the actuator 53 draws the lever 70 rearwardly with the cylindrical portion 73 held in engagement with the rear side of the cam block 50 by the action of the plunger 102 and following or guided by such side of the cam block (see the path taken by the cylindrical portion 73 and shown in dotted lines in Fig. 11 as indicated by the numeral 72ᵇ in three positions). Also during the relative rearward movement of the actuator 53 the dog 67 will ride over the lever 77 without causing the lever to actuate the lock bolt, the springs 69 acting on the dog 67 being merely depressed sufficiently for the outside of the dog to align with the groove 103 in the actuator 53.

The saddle has now moved forwardly to a point where the camming projections 61 ride over the camming portion 63 of the pin 62 and depress said pin and disengage the locking relationship between the locking shoulders 105 and 106. As soon as said locking shoulders have been disengaged, the actuator 53 will move forwardly with the saddle, the parts then being in the position indicated in Fig. 6 and in a relationship such that as soon as the saddle has reached again that point in its rearward movement at which the relative forward movement of the actuator occurs, the turret again will be unclamped, unlocked, and the indexing movement started.

It will be seen from the foregoing description of the operation of the indexing mechanism that the unlocking, unclamping, indexing, relocking and reclamping of the turret take place during the movement of the saddle in one direction, namely, during the latter portion of its rearward movement.

It will further be seen that the mechanisms for locking and relocking, clamping and unclamping, and indexing the turret are all actuated by a single or common actuating member which is carried by the saddle and has relative movement therein.

In addition to the features just enumerated, it should be noted that a part of the indexing lever, that is the forward end of the lever 70, travels along one path during the indexing of the turret, this path being defined by the cam slot, and returns to its original position along a different path, namely, along the outside of the cam block after the turret has been indexed.

While I have described the preferred embodiment of my invention, I desire it to be understood that various changes and modifications in the details of construction and arrangement of parts may be made without departing from the spirit of the invention, and I therefore aim in my claims to cover all modifications which do not involve a departure from the spirit and scope of the invention.

Having thus described my invention, I claim:

1. An indexing mechanism for a member to be indexed, locked and clamped, comprising means carrying said member, an actuator reciprocable on said means, and locking, clamping and indexing means associated with said actuator and actuated thereby during the movement of the latter.

2. An indexing mechanism for a member to be indexed, locked and clamped, comprising a reciprocable actuator, and means associated with said actuator and actuated thereby for unlocking, unclamping, indexing, locking and clamping said member during the movement of said actuator in one direction.

3. An indexing mechanism for a member to be indexed, locked and clamped, comprising a reciprocable actuator, a locking bolt, clamping means, and an indexing lever engaging said member to index the same, said bolt, clamping means and lever being actuated by said actuator during its movement in one direction to unlock, unclamp, index, lock and clamp said member.

4. An indexing mechanism for a member to be indexed, locked and clamped, comprising a movable actuator, a locking bolt, clamping means, and an indexing lever, said bolt, means and lever being actuated by said actuator during its movement in one direction to unlock, unclamp, index, lock and clamp said member, and said lever being returned by said actuator to its normal position during the movement of the actuator in the opposite direction.

5. An indexing mechanism for a member to be indexed, locked and clamped, comprising a movable actuator, a lock bolt, clamping means, means actuated by the actuator for withdrawing the lock bolt and releasing the clamping means, and additional means actuated by the actuator to restore the clamping means to clamping position.

6. An indexing mechanism for a member to be indexed, locked and clamped, comprising a movable actuator, a lock bolt, clamping members, means actuated by the actuator for withdrawing the lock bolt and releasing the clamping members, and additional means actuated by the actuator to restore the clamping members to clamping position, both of said means being actuated during movement of the actuator in one direction.

7. An indexing mechanism for a member to be indexed, locked and clamped, comprising a movable actuator, a lock bolt, means operated by the actuator for withdrawing said bolt, and a clamping means, said clamping means being actuated by said bolt during its withdrawal to release the same and operated by said actuator independently of said bolt to restore the same to clamping position.

8. An indexing mechanism for a member to be indexed, locked and clamped, comprising a movable actuator, a lock bolt, means operated by the actuator for withdrawing said bolt, and a clamping means, said clamping means being actuated by said bolt during its withdrawal to release the same and operated by said actuator independently of said bolt during its further movement in the same direction to restore the same to clamping position.

9. An indexing mechanism for a member to be indexed, locked and clamped, comprising a support, a slide on said support carrying said member, an actuator carried by said slide but having movement relative thereto, an abutment on said support adapted to be engaged by said actuator, and indexing, locking and clamping means associated with said actuator and actuated thereby during movement of the slide in one direction.

10. An indexing mechanism for a member to be indexed, locked and clamped, comprising a support, a slide thereon and carrying said member, an actuator carried by said slide and having movement relative thereto, an abutment on said support adapted to be engaged by said actuator, and indexing, locking and clamping means associated with said actuator and actuated thereby during its engagement with said abutment.

11. An indexing mechanism for a member to be indexed, locked and clamped, comprising a support, a slide thereon and carrying said member, an actuator carried by the slide but capable of movement relative thereto, an abutment on the support adapted to be engaged by said actuator to cause movement of the actuator relative to the slide, and indexing, locking and clamping means associated with said actuator and actuated thereby during its relative movement.

12. An indexing mechanism for a member to be indexed, locked and clamped, comprising a support, a slide thereon and carrying said member, an actuator carried by the slide but capable of movement relative thereto, an abutment on the support engaged by said actuator during movement of the slide in one direction to cause the relative movement of the actuator, an indexing lever, a locking bolt, and clamping means, said lever, bolt and clamping means being actuated by said actuator during its engagement with said abutment.

13. An indexing mechanism for a member to be indexed, locked, and clamped, comprising a support, a slide thereon and carrying said member, an actuator carried by said slide but capable of movement relative thereto, an abutment on the support and adapted to be engaged by said actuator during movement of the slide in one direction to cause the relative movement of the actuator, a second abutment on the support adapted to be engaged by said actuator during the movement of the slide in the opposite direction to cause a reverse relative movement of the actuator, an indexing lever, a locking bolt, and clamping means, said lever, bolt and clamping means being operated by said actuator during its engagement with the first mentioned abutment, said indexing lever being returned to normal position by said actuator during its engagement with the last mentioned abutment.

14. An indexing mechanism for a member to be indexed, locked and clamped, comprising means carrying said member, locking means, clamping means, indexing means, and a common actuator reciprocable on said first named means for actuating all of said three last named means.

15. An indexing mechanism for a member to be indexed, locked and clamped, comprising locking means, clamping means, indexing means, and a common reciprocable actuator for all of said means and actuating the same during its movement in one direction to unlock, unclamp, index, lock and clamp said member.

16. An indexing mechanism for a member to be indexed, locked and clamped, comprising a locking means, a clamping means, a lever for operating both of said means to move the same to an unlocking and unclamping position, and a movable actuator having a dog operating said lever and a cam portion to operate the clamping means to restore the same to its clamping position.

17. An indexing mechanism for a member to be indexed, locked and clamped, comprising an indexing lever, locking means, clamping means, and a movable actuator having a dog operating both of said means to unlock and unclamp said member and having a cam portion to operate said clamping means to reclamp said member, said actuator carrying said lever.

18. In combination, a member to be indexed, a block having a cam, and a lever for indexing said member and being guided during said indexing by said cam.

19. In combination, a member to be indexed, a block having a cam, a lever for indexing said member and being guided by said cam during the indexing of said member, and means for forcing said lever away from said cam after the indexing so that it will return to its starting position along a different path of movement.

20. In combination, a member to be indexed and having a slot therein, a block having a cam, and a lever for indexing said member engaging said slot and being guided by said cam during the indexing of said member.

21. In combination, a member to be indexed having a slot therein, a block having a cam, a lever for indexing said member engaging said slot and being guided by said cam during the indexing of said member, and means for forcing said lever out of said slot and away from said cam after the indexing to allow said lever to return along a different path to its starting position.

22. In combination, a member to be indexed having a radially disposed groove and slot, a block having a cam groove therein, and a lever for indexing said member engaging in said radially disposed groove and slot and being guided in said cam groove during the indexing of said member.

23. In combination, a member to be indexed having a radially disposed groove and slot, a block having a cam groove therein, a lever for indexing said member engaging in said radially disposed groove and slot and being guided in said cam groove during the indexing of said member, and means for forcing said lever out of said radially disposed groove and slot and cam groove so that it will return along a different path to its starting position after the indexing.

24. In combination, a member to be indexed, a block having a cam, a movable actuator, and a lever carried by said actuator for indexing said member and being guided during said indexing by said cam.

25. In combination, a member to be indexed having a radially disposed groove and slot, a block having a cam groove therein, a movable actuator, a lever carried by said actuator for indexing said member and engaging in said radially disposed groove and slot and being guided in said cam groove during the indexing of said member, and means for forcing said lever out of said radially disposed groove and slot and cam groove after the indexing so that it will be returned to its starting position by said actuator along a different path.

26. In combination, a support, a slide thereon and carrying a member to be indexed, locked and clamped, a block in said slide having a cam, an actuator carried by said slide but having movement relative thereto, an indexing lever associated with said actuator and guided by said cam during the indexing of said member, and locking and clamping means associated with said actuator, said lever and locking and clamping means being operated by said actuator during movement of the slide in one direction.

27. In combination, a member to be indexed, a block having a cam, a lever for indexing said member and being guided by said cam during the indexing of said member, and means for forcing and holding said lever in engagement with said cam during the indexing.

28. In combination, a member to be indexed, a block having a cam, a lever for indexing said member and being guided by said cam during indexing movement, means for forcing and holding said lever in engagement with said cam during the indexing of said member, and means for forcing said lever away from said cam at the end of the indexing, said first mentioned means pressing said lever toward said block during the return of said lever to its starting position.

29. In combination, a member to be indexed and having a reduced portion provided with a circumferential recess, said portion having a radial groove in one of the side walls of the recess and a radial slot in the other side wall thereof, a block having a cam groove, and an indexing lever extending into said recess during the indexing of said member and having a portion projecting into said radial groove and a portion projecting into said slot and cam groove and guided by the latter.

30. In combination, a member to be indexed and locked and having a reduced portion provided with a circumferential recess, said portion having a radial groove in one of the side walls of the recess and a radial slot in the other side wall thereof and provided at its circumference with a notch, a block having a cam groove, an indexing lever extending into said recess during the indexing movement of said member and having a portion engaging said radial groove and a portion engaging in said slot and cam groove and guided by the latter, and a lock bolt engaging said notch after the indexing of said member.

31. In combination, a member to be indexed, locked and clamped and having a reduced portion provided with a circumferential recess, said portion having a radial groove in one of the side walls of the recess and a radial slot in the other side wall thereof and provided at its circumference with a notch, a block having a cam groove, a movable actuator, an indexing lever connected with said actuator and extending into said recess during the indexing of said member and having a portion engaging in said radial groove and a portion engaging in said slot and cam groove and guided in the latter, a lock bolt engaging said notch after said member has been indexed, a clamping means for said member, and means operatively connecting said lock bolt and said clamping means with said actuator.

32. In combination, a support, a member to be indexed, locked and clamped arranged thereon and having a reduced portion provided with a circumferential recess, said portion having a radial groove in one of the side walls of the recess and a radial slot in the other side wall thereof and provided at its circumference with a notch, a block having a cam groove, a movable actuator, an indexing lever carried by said actuator and adapted to be moved thereby into said recess during the indexing of said member and having a portion engaging in said radial groove and a portion engaging in said slot and cam groove and guided in the latter, a lock bolt engaging said notch after said member has been indexed, a clamping means for said member, and means operatively connecting said lock bolt and said clamping means with said actuator, said actuator during its movement in one direction causing withdrawal of said lock bolt and unclamping of said clamping means, indexing of said member and restoration of said clamping means to clamping position.

33. In combination, a support, a member to be indexed, locked and clamped arranged thereon and having a reduced portion provided with a circumferential recess, said portion having a radial groove in one of the side walls of the recess and a radial slot in the other side wall thereof and provided at its circumference with a notch, a block having a cam groove, a movable actuator, an indexing lever carried by said actuator and adapted to be moved thereby into said recess during the indexing of said member and having a portion engaging in said radial groove and a portion engaging in said slot and cam groove and guided in the latter, means for forcing said lever out of said recess and said portions out of engagement with said radial groove, slot and cam groove to be returned after indexing to its starting position along a different path, a lock bolt engaging said notch after said member has been indexed, a clamping means, and means operatively connecting said lock bolt and said clamping means with said actuator, said actuator during its movement in one direction withdrawing said lock bolt, releasing said clamping means, indexing said member, and restoring said clamping means to clamping position and during its movement in the opposite direction restoring the lever to its starting position.

34. In a machine, in combination, a support having a plurality of guideways, a slide movable on one of the guideways, a hydraulic motor having a cylinder movable on another guideway, and a connection between said cylinder and said slide to cause movement of the slide upon movement of said cylinder.

35. In a machine, in combination, a support having a plurality of guideways spaced from each other in different planes, a slide on one of said guideways, a hydraulic motor having a cylinder movable on another of said guideways, and a connection between said slide and said cylinder to cause movement of the slide upon movement of said cylinder.

36. An indexing mechanism for a member to be indexed, locked and clamped, comprising a movable actuator, and locking, clamping, and indexing means, said actuator constituting the actuating means for said means.

37. An indexing mechanism for a member to be indexed, locked and clamped, comprising a support, a slide on said support carrying said member, indexing means for said member, an actuator carried by said slide for said means and having movement relative to said slide, abutment means for engaging said actuator during movement of said slide in one direction to effect relative movement between it and said actuator, and means engageable by said actuator during movement of said slide in the opposite direction to effect relative movement between it and said actuator.

38. An indexing mechanism for a member to be indexed, locked and clamped, comprising a support, a slide on said support and carrying said member, an indexing means for said member, an actuator for said means carried by said slide but having movement relative thereto, abutment means carried by said support for engaging said actuator to cause said relative movement between it and said slide, and means carried by said slide and engaging said abutment means during movement of the slide in one direction to render said abutment means ineffective whereby said slide and said actuator will move together.

EDWARD P. BURRELL.